United States Patent [19]

Higuchi et al.

[11] 4,038,168
[45] July 26, 1977

[54] GALVANIC ANODE TYPE CATHODIC PROTECTION APPARATUS

[75] Inventors: Tadamasa Higuchi, Sayama; Morihiko Kuwa, Ageo; Hiroshi Saito, Sakado, all of Japan

[73] Assignee: Nakagawa Corrosion Protecting Co., Ltd., Tokyo, Japan

[21] Appl. No.: 626,821

[22] Filed: Oct. 29, 1975

[51] Int. Cl.$^2$ ............................................. C23F 13/00
[52] U.S. Cl. .................................. 204/197; 204/286; 204/288; 204/297 R
[58] Field of Search ............................... 204/148, 197

[56] References Cited

U.S. PATENT DOCUMENTS

| | | | |
|---|---|---|---|
| 2,743,227 | 4/1956 | Waite et al. | 204/197 |
| 3,066,090 | 11/1962 | Spector | 204/197 |
| 3,146,182 | 8/1964 | Sabins | 204/197 |
| 3,232,857 | 2/1966 | Caldwell | 204/197 |
| Re. 25,565 | 4/1964 | Sabins | 204/197 |

*Primary Examiner*—T. Tung
*Attorney, Agent, or Firm*—Watts, Hoffmann, Fisher & Heinke Co.

[57] ABSTRACT

A galvanic anode type cathodic protection apparatus, which comprises a guide installed alongside a structure to be protected from corrosion and plural number of sacrificial anodes consisting of anode core and metallic (or alloyic) anode material or sacrificial anodes consisting of anode core, metallic (or alloyic) anode material and metal fitting attached to anode core, wherein said sacrificial anodes are continuously fitted in said guide by means of said anode core or metal fitting attached to anode core, said anode cores are interconnected and at least one of the anode cores of the sacrificial anodes positioned at the extremities of the continuity of sacrificial anodes is fixed on said structure.

13 Claims, 28 Drawing Figures

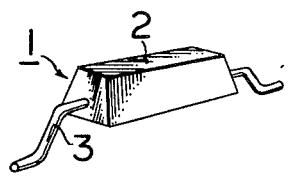
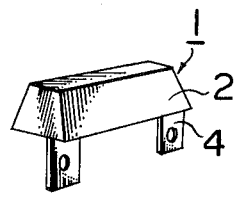
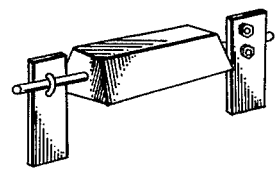
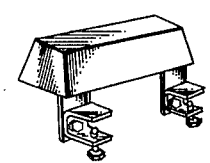
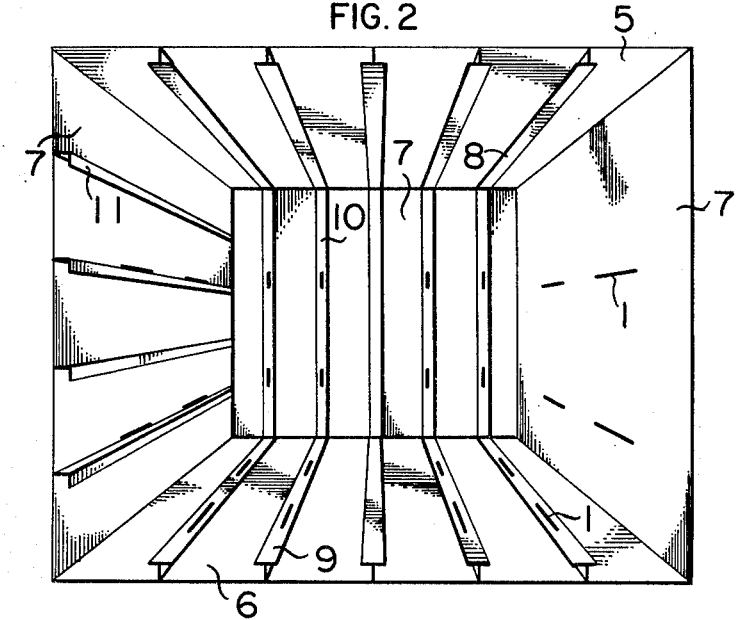

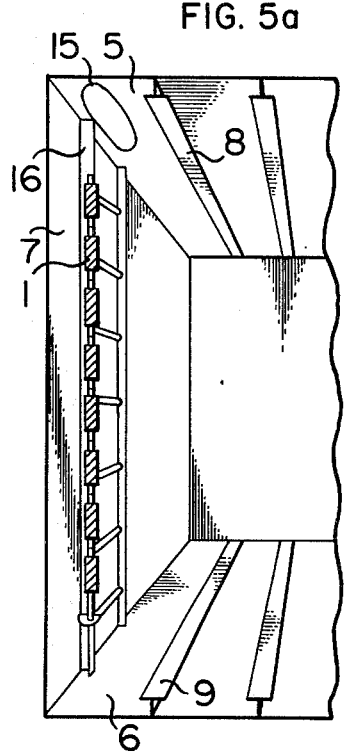
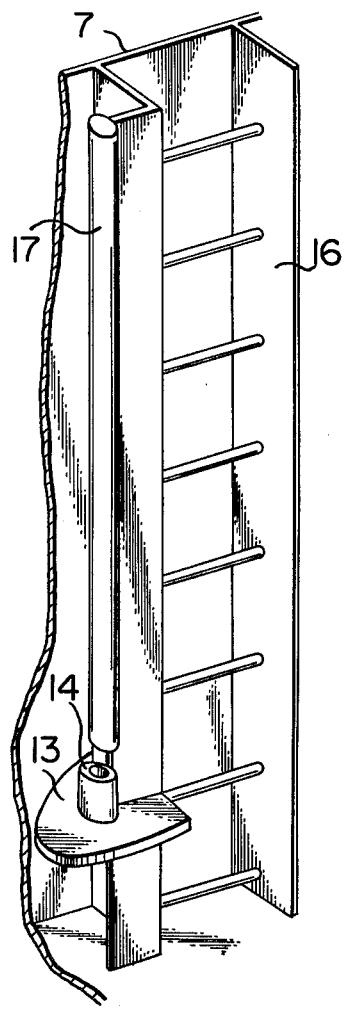
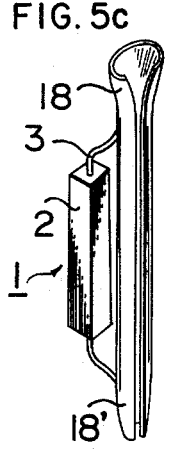
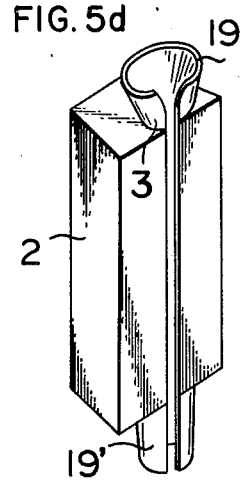
FIG. 5a
FIG. 5b
FIG. 5c
FIG. 5d

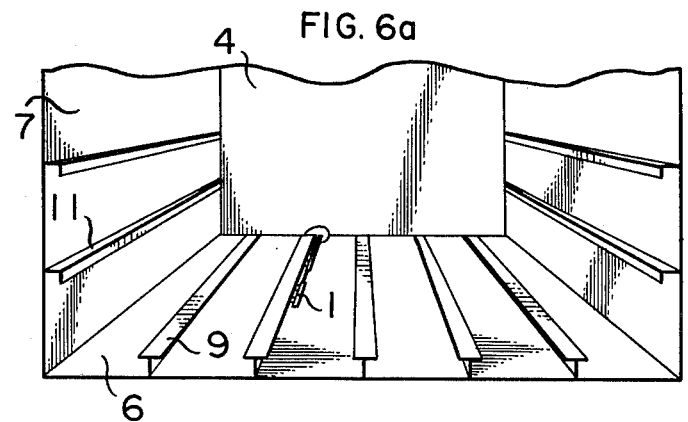
FIG. 6a
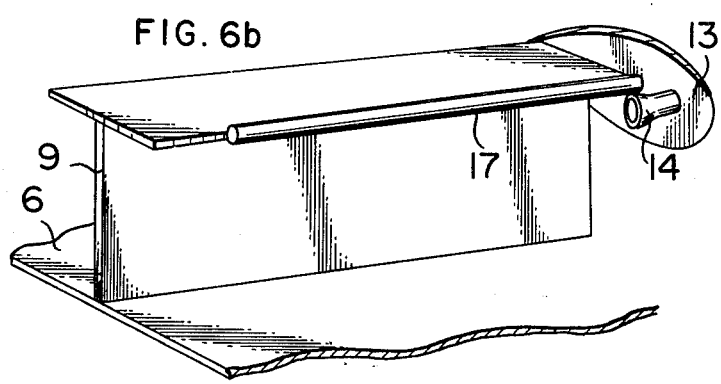
FIG. 6b
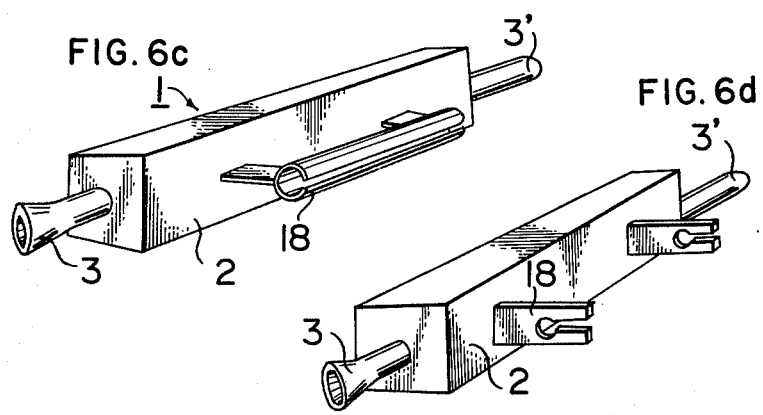
FIG. 6c
FIG. 6d

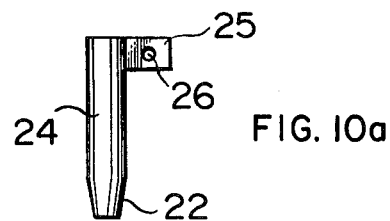
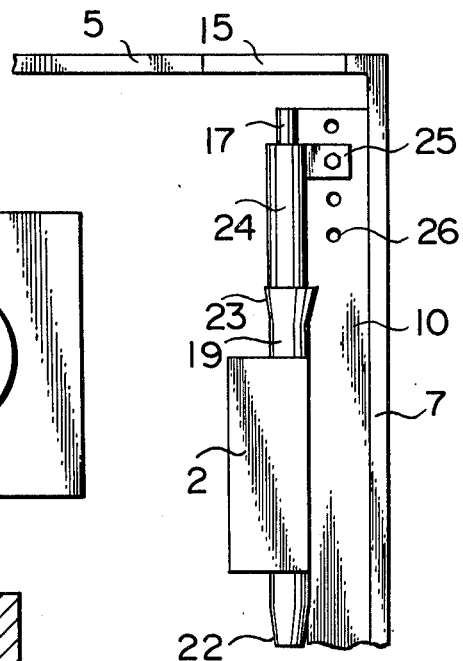
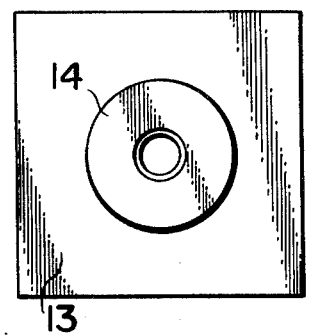
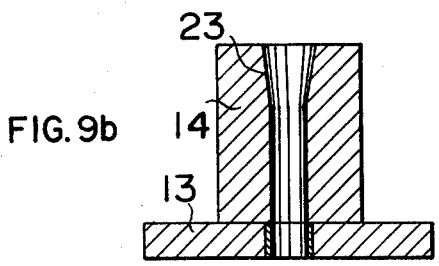
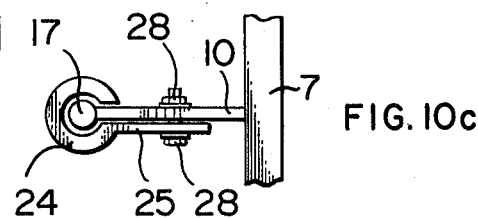

GALVANIC ANODE TYPE CATHODIC PROTECTION APPARATUS

BACKGROUND OF THE INVENTION a. Field of the Invention

The present invention relates to a galvanic anode type cathodic protection apparatus which comprises cathodic protection sacrificial anodes as installed on a structure to be protected from corrosion (hereinafter called 'the structure' for short), such as the inner side of a ballast tank of ship.

b. Description of the Prior Art

A galvanic anode type cathodic protection apparatus utilizing a sacrificial anode — especially a core-inserted sacrificial anode — for the purpose of protecting metal structures exposed to corrosive environment from electrochemical corrosion has hitherto been prevalently applied to the underground gas pipeline, harbor structures, ship hull, ballast tanks of tanker, etc.

In order words, for the purpose of preventing corrosion of metal structure laid in the sea or the ground, such as the hull of ocean-going ship, the tank of tanker, the pipeline network for petroleum, gas and water service, etc., the use of sacrificial anodes such as zinc, aluminum or magesium as well as alloys thereof is prevalent. Most of these anodes are usually formed into a shape of cast block or slab with steel or copper core which is beforehand plated with zinc or cadmium, and the anode core is normally fixed on the structure by welding or bolting or such like, thereby electrically being connected with the structure. Besides, according to the prior art, the sacrificial anodes have been individually installed on the structure at considerable expenses for installation.

Nowadays, the stuctures as the object of corrosion prevention have become large-sized, coupled with getting complicated in construction. As a result, in the existing circumstances, the number of sacrificial anodes for use in a single corrosion preventive apparatus is on the increase, leading to a sharp increase in time and labor required for installing anodes. Particularly, the replacement of anodes at a place in the upper part of the structure where no staging for installation is available is too difficult to perform and even if the replacement is possible, it will require much time, labor and expense.

For instance, in the case of the upper part of bulkhead in the inside of a ballast tank, though the anode can be installed at the time of building the ship, there are instances where the position for installing the anode is shifted to the bottom of tank or installation thereof is dispensed with by taking into consideration the time and labor to be required for repairment or replacement of anodes and the cost of temporary staging, resulting in failure to obtain the effect of corrosion control as expected.

Meanwhile, from the view point of handiness of the anode and work efficiency in installing it within the tank, there are frequent occasions when it becomes necessary to limit the unit weight of anode. Under such circumstances, the number of anodes to be installed is inevitably increased. And, in the cases of harbor facilities and offshore structures, the anode installation work must be performed often under water, entailing much time for the work.

Such being the case, invention of an cathodic protection apparatus that will render it possible to install and replace the anode easily, safely, rapidly and economically has been strongly demand by the industrial world concerned.

SUMMARY OF THE INVENTION

Once object of the present invention is to provide a galvanic anode type cathodic protection apparatus which renders it possible to install anodes easily without welding or bolting individual anode directly onto the structure at the time of newly establishing said structure or at the time of replacing anodes. Another object of the present invention is to provide a galvanic anode type cathodic protection apparatus which renders it possible to install anodes easily without resorting to any underwater operations even in the case of harbor facilities.

The apparatus according to the present invention consists essentially of a guide installed alongside the struucture and plural number of sacrificial anodes consisting of anode core and metallic (or alloyic) anode material or sacrificial anodes consisting of anode core, metallic (or alloyic) anode material and metal fitting attached to anode core, wherein said sacrificial anodes are successively fitted in said guide by means of said anode core or metal fitting attached to anode core, the anode cores of plural sacrificial anodes are interconnected and the anode core of at least one of the two sacrificial anodes positioned at the extremities of the continuity of sacrificial anodes is fixed on said structure.

The guide to be installed alongside the structure is (a) a hollow rod having a lengthwise streak of continuous opening installed on a part of the material constituting the stiffener of the structure of (b) a rod installed on a part of the material constituting the stiffener of said structuure or a newly set-up structural member. And, the sacrificial anode for use in the present apparatus is one consisting of metallic or alloyic anode material and anode core of one consisting of metallic or alloyic sacrificial anode, anode core and metal fitting attached to anode core.

In other words, the present invention covers:

1. a galvanic anode type cathodic protection apparatus, wherein a hollow rod having a lengthwise streak of continuous opening is installed as the guide on a part of the material constituting the stiffener of the structure or a newly set-up structural member, a continuity of sacrificial anodes having metal fitting attached to anode core to fit in said guide to be free from slipping out of said opening and extending to a stopping plate provided on one end of the guide or in the vicinity thereof is supported on the guide, and at least one end of the anode core of said single sacrificial anode or the anode core positioned at the extremities of said continuity of sacrificial anodes or metal fitting attached to the anode core is fixed on a holder equipped on said stopping plate or said structure.

2. a galvanic anode type cathodic protection apparatus, wherein a rod is installed as the guide on a part of the material constituting the stiffener of the structure or a newly set-up structural member, a continuity of sacrificial anodes having a hollow anode core with a lengthwise continuous opening or a metal fitting attached to hollow anode core having a continuous opening is supported on the guide to extend to a stopping plate provided on one end of the guide or in the vicinity thereof by means of said hollow anode core or metal fitting attached to hollow anode core, and at least one end of the anode core of said single sacrificial anode or the anode core positioned at the extremities of said continuity of sacrificial anodes or metal fitting attached to the anode core is fixed on a holder equipped on said stopping plate or said structure.

In the above examples of the present invention, the anode is installed on the structure by means of the combination of a guide and an anode core to fit in said guide or a metal fitting attached to anode core, and plural sacrificial anodes are piled up one upon another from the bottom up to the top of the guide or set in one after another from one end to the other end of the guide to be interconnected successively, but it also will do to support plural sacrificial anodes on the guide by regularly spacing them by use of some space adjusting parts. And, it is of course conceivable to apply just one sacrificial anode.

BRIEF DESCRIPTION OF THE DRAWING

In the appended drawings, FIGS. 1(a), 1(b), 1(c) and 1(d) are perspective views of conventional types of sacrificial anodes, FIGS. 2 is a schematic representation of the state of convention sacrificial anodes as installed on the structure, FIGS. 3(a), 3(b), 3(c), 4(a), 4(b), 4(c), 5(a), 5(b), 5(c), 5(d), 6(a), 6(b), 6(c), 6(d), 7(a) and 7(b) are perspective views of embodiments of application of apparatuses according to the present invention to the ballast tank of ship, FIGS. 9(a) and 9(b) are drawings showing the plane figure and sectional view of a holder suitable for the apparatus according to the present invention, and FIG. 10(a), 10(b) and 10(c) are drawings showing the fixing metal fitting (a space adjusting part) for use in the apparatus according to the present invention. And, in these drawings, the reference numeral 1 denotes the sacrificial anode, 2 denotes the metallic or alloyic anode material, 3 denotes the anode core, 4 denotes the metal fitting attached to anode core, 5 denotes the upper deck, 6 denotes the bottom plate, 7 denotes the bulkhead, 8 denotes the upper deck stiffener, 9 denotes the bottom stiffener, 10 denotes the bulkhead's longitudinal stiffener, 11 denotes the bulkhead's transverse stiffener, 12 denotes the hollow rod, 13 denotes the stopping plate, 14 denotes the holder 15, denotes the anode putting in hole, 16 denotes the ladder, 17 denotes the rod, 18 denotes the hollow metal fitting attached to anode core, 19 denotes the hollow anode core, 20 denotes the steel sheet pile, 21 denotes the steel pipe pile, 22 denotes the plug-shaped part, 23 denotes the socket-shaped part, 24 denotes the space adjusting part, 25 denotes the fixing plate, 26 denotes the bolt setting hole, 27 denotes the stiffener, and 28 denotes the bolt-nut.

DETAILED DESCRIPTION OF THE INVENTION

Figure 3A:
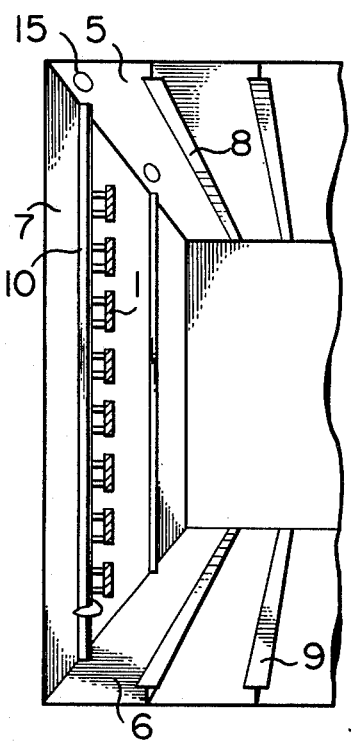

As seen in FIG. 1, the conventional mode of installing the sacrificial anode has been such that, in the case of a sacrificial anode having round bar-shaped anode core as shown in FIG. 1 (a), for instance, said round bar-shaped anode core is either directly welded onto the structure or fastened to a metal fitting with U-bolt as shown in FIG. 1 (b) and then said metal fitting is directly welded onto the structure. There have also been adopted such modes as directly welding a metal fitting attached to anode core having a bolt-setting hole as shown in FIG. 1(c) onto the structure, or fixing said metal fitting attached to anode code to a metal fitting as previously installed on the structure with bolt-nut, or fixing the sacrificial anode to the structure by means of a simple clasp as shown in FIG. 1 (d).

Shown in FIG. 2 is a mode of installation of such conventional sacrificial anodes on a structure such as the tank of ship. To be precise, the sacrificial anodes the installed on the respective stiffeners provided for the upper deck 5, tank's bottom plate 6 and vertical bulkhead 7, that is, the stiffeners for tank 8, 9, 10 and 11 consisting of the upper deck's stiffeners 8, bottom's stiffeners 9, bulkhead's longitudinal stiffeners 10 and bulkhead's transverse stiffeners 11.

On the other hand, the sacrificial anode for use in the present invention is either composed of metallic or alloyic anode material and anode core or composed of metallic or alloyic anode material, anode core and metal fitting attached to anode core, and in the case of the former sacrificial anode, said anode core is a hollow anode core. The construction of these sacrificial anodes is as exemplified in FIG. 3 (c), FIG. 4 (c), FIG. 5 (c), FIG. 5 (d), FIG. 6 (c) and FIG. 6 (d).

The guide for use in the present invention is made of metal and is to be installed on a part of the material constituting the stiffener of the structure or the newly set-up structural member. The guide is in the shape of a hollow rod having a lengthwise streak of continuous opening or a normal rod, such as shown in FIG. 3 (b), FIG. 4 (b), FIG. 5 (b), FIG. 6 (b), FIG. 7 (b), FIG. 8 (a) and FIG. 8 (b).

Hereunder will be explained the details of the present apparatus with reference to the appended drawings.

Figure 3B:
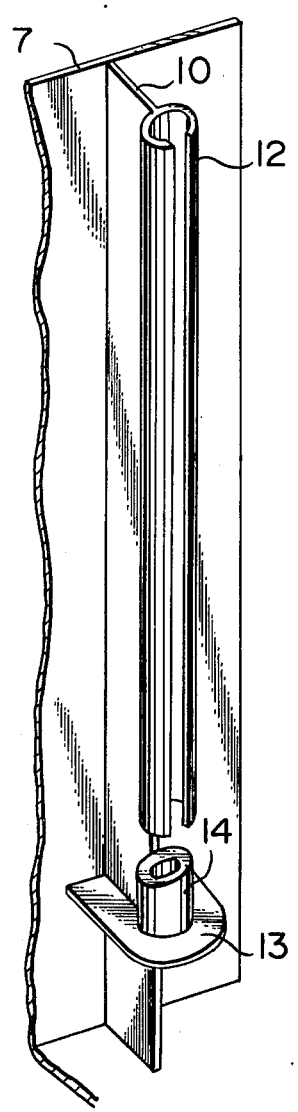
Figure 3C:
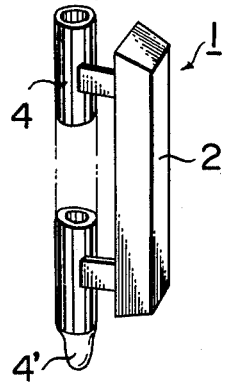

Shown in FIG. 3 is an embodiment of the present invention which utilizes bulkhead's longitudinal stiffener 10 of the bulkhead 7 of tank. FIG. 3 (a) is the external appearance of a mode of installation, FIG. 3 (b) is a detail drawing of the hollow rod 12 to serve as the guide and the stopping plate 13, and FIG. 3 (c) is a side view of a sacrificial anode to fit in said guide. On the bulkhead's longitudinal stiffener 10 extending from the upper deck 5 of tank down to the bottom of tank, as installed on the bulkhead 7 of tank is installed the hollow rod 12 having a lengthwise streak of opening, and beneath said hollow rod 12 is provided the holder 14 fixed on the stopping plate 13. The holder 14 is somewhat dented so as to support the tip 4' of the metal fitting attached to anode core of the sacrificial anode. The sacrificial anode having the metal fitting 4 attached to anode core to fit in the hollow rod 12 is inserted — with the tip 4' of said metal fitting in the lead — in the upper end of the hollow rod 12 and then is let down along the hollow rod 12 as guide. Practically, through the anode-setting hole 15 provided on the upper deck 5 of tank, the sacrificial anode is let down in such a direction as will make the tip 4' of metal fitting attached to anode core of the sacrificial anode agree with the holder 14. Upon confirming perfect agreement of the tip 4' of the metal fitting attached to anode core of one sacrificial anode with the holder 14, the next sacrificial anode is inserted in the hollow rod 12 and let down in the same way as above. Consequently, the tip of the metal fitting attached to anode core of the next inserted sacrificial anode comes to be connected with the upper end of the metal fitting attached to anode core of the previously inserted sacrificial anode. By repeating this operation plural number of times, a prescribed number of sacrificial anodes are installed. In this connection, as the tip 4' of the metal fitting attached to anode core of the lowermost sacrificial anode is to become electrically connected with the holder 14 (this holder 14 is being connected with the structure) subject to perfect conjoining thereof, it is necessary to ensure such conjoining. Further, in the metal fitting attached to anode core of sacrificial anode shown in FIG. 3 (c), the portion indicated by the dotted line may be omitted if allowed from the view point of strength.

Figure 4A:
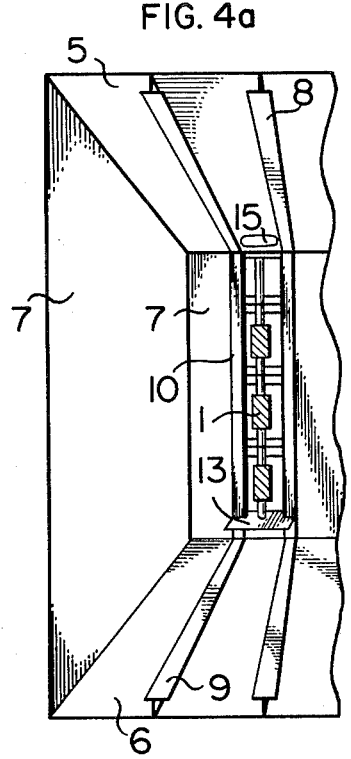
Figure 4B:
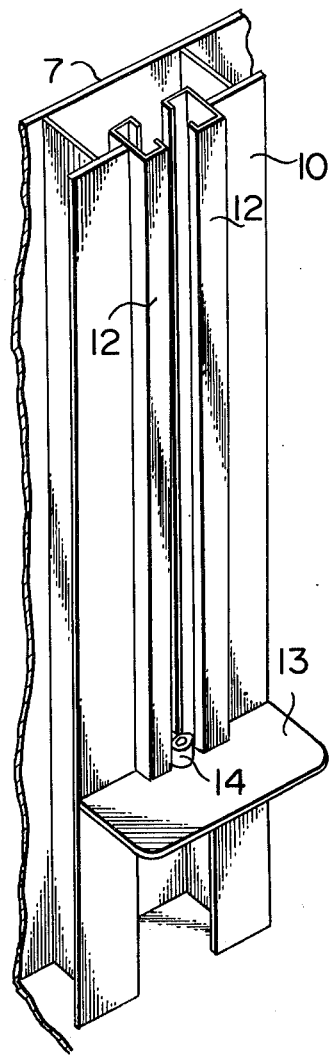
Figure 4C:
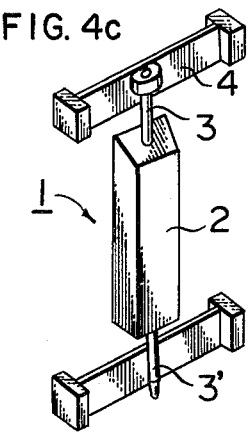

Shown in FIG. 4 is another embodiment of the present invention which utilizes the bulkhead's longitudinal stiffener 10 of the bulkhead 7 of tank like in the case of FIG. 3. FIG. 4 (a) is the external appearance of a mode of installation, FIG. 4 (b) is a detail drawing of the hollow rod 12 to serve as the guide — wherein a pair of hollow members having ⊐-shaped section are installed face to face — and the stopping plate 13, and FIG. 4 (c) is a side view of a sacrificial anode to fit in this guide. The procedure for installing a prescribed number of sacrificial anodes in this embodiment is quite the same as explained with regard to the embodiment in FIG. 3. But, if remotely compared, difference lies in the shape of the hollow rod 12 and the sacrificial anode. A sacrificial anode to fit in the hollow rod 12 is one provided with a metal fitting attached to anode core which supports the upper and lower ends of anode core and can be fitted in the hollow rod 12 slidably or by leaving space in some measure.

Shown in FIG. 5 is still another embodiment of the present invention which utilizes a vertical ladder 16 installed on the vertical bulkhead 7 of tank. FIG. 5 (b) is a detail drawing of the vertical ladder 16, the rod 17 to serve as the guide and the stopping plate 13, and FIG. 5 (c) is a side view of a sacrificial anode to fit in said guide. The rod 17 herein is in the shape of round bar, but it may be a hollow rod as occasion demands. The sacrificial anode herein is either one having a hollow metal fitting 18 attached to anode core with a lengthwise streak of opening (See FIG. 5 (c)) or one having a hollow anode core 19 with a lengthwise streak of opening (See FIG. 5 (d)). The inside diameter of these hollow metal fitting 18 attached to anode core and hollow core 19 is somewhat larger than the outside diameter of the rod 17 and the width of the opening is somewhat larger than the thickness of the stiffener (vertical ladder 16). And, the upper part of these hollow metal fitting 18 attached to anode core and hollow anode core 19 is somewhat expanded to take the shape of a socket, while the lower part thereof is shaped like a plug suitable for fitting in said socket-shaped part.

On the vertical ladder 16 extending from the upper deck 5 of tank to the bottom 6 of tank as installed on the bulkhead 7 of tank is installed the rod 17 to fit in said hollow metal fitting 18 attached to anode core and hollow anode core 19 as the guide, and sacrificial anodes are supposed to be successively led into this guide downward from the upper end thereof.

Shown in FIG. 6 is an additional embodiment of the present invention wherein the apparatus according to the present invention is applied to the bottom stiffener 9 attached to the bottom plate 6 of tank. FIG. 6 (a) is the external appearance of the mode of installation, FIG. 6 (b) is a detail drawing of the rod 17 to serve as the guide as installed on the bottom stiffener 9 and the stopping plate 13, FIG. 6 (c) is a side view of a sacrificial anode having a hollow metal fitting 18 attached to anode core with a lengthwise continuous opening, and FIG. 6 (d) is a side view of a sacrificial anode prepared by replacing the hollow metal fitting 18 attached to anode core shown in FIG. 6 (c) with two plates which are respectively provided with a hole. In this embodiment, on the bottom stiffener 9 fixed on the bottom plate 6 of tank is installed the rod 17 to fit in the hollow metal fitting 18 attached to anode core of sacrificial anode or the metal fitting 18 attached to anode core of sacrificial anode as the guide. Near one end of said rod 17 is of course installed the stopping plate 13 equipped with the holder 14. And, the hollow metal fitting 18 attached to anode core is inserted in this rod 17 and moved until it reaches the holder 14 and is stopped thereby. Next sacrificial anode is supported on the rod 17 in the same way as above and at the same time is connected with the preceding sacrificial anode. In this connection, in the present embodiment, the sacrificial anode shown in FIG. 5 may be used, but in that case, it is necessary to shift the position of the holder 14 in a measure.

Figure 7A:
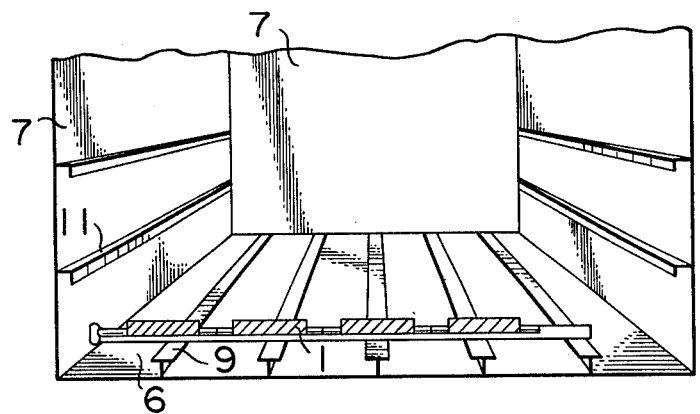
Figure 7B:
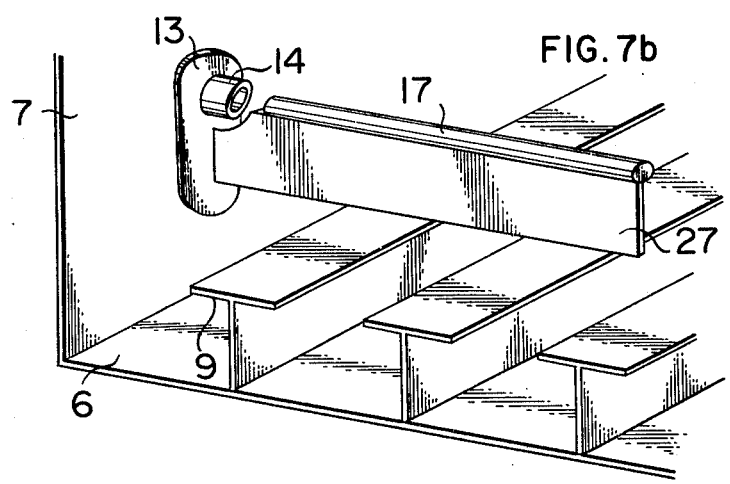

Shown in FIG. 7 is also an additional embodiment of the present invention wherein the apparatus according to the present invention is applied to the bottom plate 6 of tank like in the case of FIG. 6. The sacrificial anode to be used herein is of the same construction as that in FIG. 5 (d), and accordingly, the sacrificial anode shown in FIG. 5 (c) is of course usable.

Although the foregoing explanation with reference to FIGS. 3 to 7 centers on embodiments wherein the apparatus according to the present invention is applied to the ballast tank of ship, it goes without saying that the scope of application of the present apparatus is not limited to the above, but it is also applicable to harbor facilities and so forth.

Figure 8A:
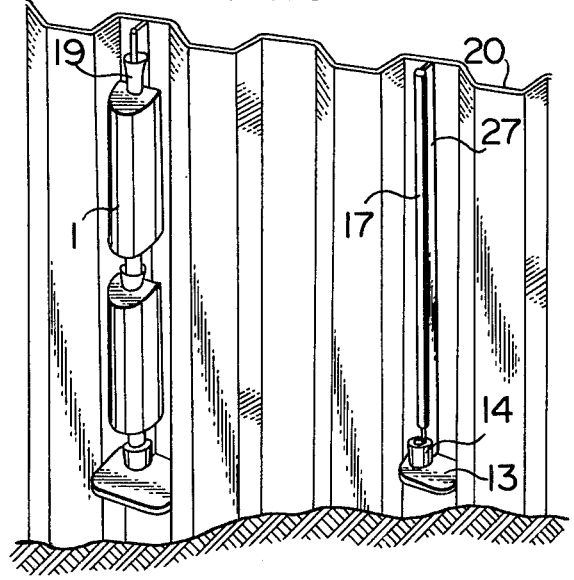
FIGS. 8a and 8b are perspective views of embodiments of applications according to the present invention to harbor facilities.
Figure 8B:
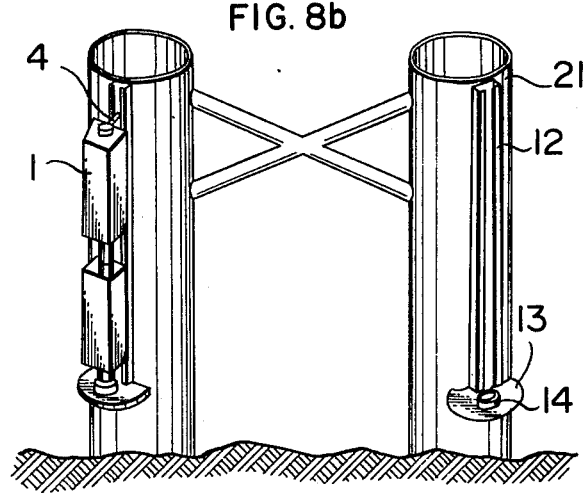

Shown in FIG. 8 is an embodiment of application of the present apparatus to harbor facilities. FIG. 8 (a) is illustrative of the application of the present apparatus to the steel sheet pile 20 and FIG. 8 (b) is illustrative of the application thereof to the steel pipe pile 21. To be precise, in the embodiment in FIG. 8 (a), the stiffener 27 having the rod 17 to serve as the guide and the stopping plate 13 are installed on the steel sheet pile 20, and the sacrificial anode 1 having the hollow anode core 19 to fit on said rod 17 is installed. And, in the embodiment in FIG. 8 (b), the hollow rod 12 is installed as the guide on the steel pipe pile 21, and the sacrificial anode 1 having the metal fitting 4 attached to anode core to fit on said hollow rod 12 (a sacrificial anode such as shown in FIG. 4 (c)) is installed.

As described in the foregoing, in the case where plural number of sacrificial anodes are successively installed, the upper end and the lower end of adjoining sacrificial anodes must be connected by means of their anode cores, and the lower end of the sacrificial anode to be first inserted in the rod must be connected with the holder 14 and the anode core and the structure must be electrically connected. Accordingly, the upper part of the holder 14 installed on the stopping plate 13 is supposed to be of socket-like shaped as shown in FIG. 9 (a) (plane figure) and FIG. 9 (b) (sectional view).

FIG. 10 is illustrative of the means for fixing the sacrificial anode on the structure without resorting to the holder 14. In FIG. 10 (a), one end of the space adjusting part 24 is provided with the fixing metal plate 25 having the bolt-setting hole 26, and the other end thereof is formed into the plug-shaped part 22 so as to fit in the socket-shaped part 23 of the hollow anode core 19 of sacrificial anode. FIG. 10 (b) is illustrative of the state of the space adjusting part 24 as fixed to the structure while interconnecting the sacrificial anode and the fixing plate 25, wherein the bolt-setting hole 26 of the fixing plate 25 is made to agree with the bolt-setting hole provided on the stiffener 10 of the structure and said fixing plate 25 and stiffener 10 are connected by fastening with the bolt-nut 28 through these holes. According to this mode of fixing, not only the sacrificial anode can be successively fixed at prescribed intervals to a certainty but also the electrical connection between fellow sacrificial anodes and between the sacrificial anodes and the structure can be ensured.

As will be understood from the above explanation with reference to several embodiments, according to the apparatus under the present invention, it is possible to install sacrificial anodes easily, rapidly, safely and economically by merely working upon a part of the members of the stiffeners for the structure and without resorting to such operations as installing the sacrificial anodes by welding or cutting off the consumed sacrificial anodes at the time of newly setting up or repairing the structure. In order to replace the sacrificial anodes, it will do to thrust a long pole with a hook, for instance, through the anode-setting hole 15 of the upper deck of tank from above or from the side, catch the consumed sacrificial anodes with said hook and pull them up or shift them transversely to take out one by one, and then send in new sacrificial anodes one by one after taking out all the consumed sacrificial anodes. In the case of an apparatus such as shown in FIG. 10, the replacing of sacrificial anodes can be performed by operating the bolt-nut. It goes without saying that, according to the kind of the object structure, application of a single sacrificial anode may suffice.

For instance, in the case of applying the apparatus of the present invention to a ballast tank, according to the mode of installation wherein a vertical ladder is concurrently used as an cathodic protection apparatus as described in the foregoing, it will do to install a vertical ladder for each compartment of the interior of the tank systematically at the time of building it and install the present apparatus thereon. In this way, not only the corrosion preventive effect extending to the upper part of the tank can be improved, but also the inspection of the inside of the tank incident to the increase in size of ships is facilitated, the corrosion preventive effect can be confirmed and the state of consumption of sacrificial anodes installed on the upper part of tank can be examined, so that it is very effective.

Besides, according to the mode of installing the sacrificial anode by fixing a rod or a hollow rod on the stiffener for the structure, it is also possible to install the apparatus of the present invention at the time of building the structure. In other words, by taking into consideration the skeletal structure and configuration of the stiffener for the tank, it is possible to install the apparatus of the present invention without requiring any additional members to be supplemented later, and the cost can be drastically reduced. Further, application of the apparatus of the present invention renders it possible to perform operations even on the upper deck of tank, regardless of the time when the tank is filled with water or the ship is at sea, not to speak of the time when the tank is empty.

Moreover, in the case of applying the present apparatus to harbor facilities or the like, provision of the guide at the time of building the structure will dispense with underwater welding for the purpose of installing sacrificial anodes later, and even when it becomes necessary to replace sacrificial anodes under some circumstances, operations can be safely and rapidly performed without resorting to underwater work.

In the apparatus of the present invention, the hollow rod to serve as the guide and the hollow anode core or the metal fitting attached to hollow anode core constituting the sacrificial anode are not limited to such ones as having the above described shapes; they can be appropriately modified as occasion demands. Also, according to the present invention, the anode can be small in number, and in the case where interconnection of fellow anodes is unnecessary, it is possible to install the number of anode required by cathodic protection design by use of the space adjusting part, and thus an appropriate cathodic protection apparatus can be realized.

What is claimed is:

1. A galvanic anode type cathodic protection apparatus, wherein a hollow rod having a lengthwise streak of continuous opening is installed as the guide on a part of a structural member, a single sacrificial anode or a continuity of at least 2 sacrificial anodes each having a core and a fitting attached to said core and supported by said guide in a manner as to be free from slipping out of said opening and a stopping plate provided at one end of the guide having a holder holding one end of the core or the fitting in the case of a single anode, or one end of the core or the fitting at one extremity of the continuity of anodes in the case of more than one anode.

2. A galvanic anode type cathodic protection apparatus, wherein a rod is installed as the guide on a part of a structure, a single sacrificial anode or a continuity of at least 2 sacrificial anode each having a hollow anode core with a lengthwise continuous opening or a fitting with a lengthwise continuous opening attached to an anode core and supported by said guide in a manner as to be free from slipping out of said opening, and a stopping plate provided at one end of said guide having a holder holding one end of the hollow anode core or the fitting in the case of a single anode, or one end of the hollow anode core or the fitting at one extremity of the continuity of anodes in the case of more than one anode.

3. An apparatus according to claim 1, wherein one end portion of said anode core or metal fitting is formed into a plug-like shape and the other end portion thereof is formed into a socket-like shape.

4. An apparatus according to claim 3 wherein said socket-like shape is constructed to receive a plug-like shape identical to said one end portion.

5. An apparatus according to claim 3 wherein the sacrificial anode is fixed on the structural member by utilizing a space adjusting part.

6. An apparatus according to claim 1, wherein the sacrificial anode is fixed on the structural member by utilizing a space adjusting part.

7. An apparatus according to claim 1 wherein the fitting is metal.

8. An apparatus according to claim 2 wherein one end portion of said anode core or metal fitting is formed into a plug-like shape and the other end portion thereof is formed into a socket-like shape.

9. An apparatus according to claim 8 wherein said socket-like shape is constructed to receive a plug-like shape identical to said one end portion.

10. An apparatus according to claim 8 wherein the sacrificial anode is fixed on the structural member by utilizing a space adjusting part.

11. An apparatus according to claim 2 wherein the sacrificial anode is fixed on the structural member by utilizing a space adjusting part.

12. An apparatus according to claim 2 wherein the fitting is metal.

13. A galvanic anode type cathodic protection apparatus, including a guide rod on a structure to be protected, a sacrificial anode having an anode core, a hollow metal fitting attached to the anode core, said fitting having a continuous opening extending the length of the fitting, and one of said fitting and core extending to and making an electrically conductive contact with a stopping plate at or adjacent one end of said guide rod.

* * * * *

UNITED STATES PATENT AND TRADEMARK OFFICE
CERTIFICATE OF CORRECTION

PATENT NO. : 4038168
DATED : July 26, 1977
INVENTOR(S) : Tadamasa Higuchi et al.

It is certified that error appears in the above-identified patent and that said Letters Patent are hereby corrected as shown below:

Column 2, line 17, "struucture" should be -- structure --;

Column 2, line 33, "structuure" should be -- structure --;

Column 2, line 36, "of", first occurrence, should be -- or --;

Column 3, line 20, "FIGS." should be -- FIG. --;

Column 3, line 28, after "applications" insert -- of apparatuses --;

Column 3, line 33, "FIG." should be -- FIGS. --;

Column 3, line 45, "holder 15," should be -- holder, 15 --;

Column 3, line 68, "code" should be -- core --;

Claim 2, line 4, "anode", first occurrence, should be -- anodes --.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks